United States Patent
Liu et al.

(10) Patent No.: US 10,490,891 B2
(45) Date of Patent: Nov. 26, 2019

(54) ANTENNA ADJUSTMENT METHOD, ANTENNA, AND BASE STATION CONTROL CENTER

(71) Applicant: Huawei Technologies Co., Ltd., Shenzhen, Guangdong (CN)

(72) Inventors: Tao Liu, Xi'an (CN); Wei Luo, Shenzhen (CN); Meng Xu, Xi'an (CN); Chaohui Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 15/258,855

(22) Filed: Sep. 7, 2016

(65) Prior Publication Data

US 2016/0380352 A1  Dec. 29, 2016

Related U.S. Application Data

(63) Continuation of application No. PCT/CN2015/073692, filed on Mar. 5, 2015.

(30) Foreign Application Priority Data

Mar. 7, 2014  (CN) .......................... 2014 1 0084475

(51) Int. Cl.
*H01Q 3/00* (2006.01)
*H01Q 3/08* (2006.01)
(Continued)

(52) U.S. Cl.
CPC ............... *H01Q 3/08* (2013.01); *H01Q 3/005* (2013.01); *H04W 16/28* (2013.01); *H01Q 1/1264* (2013.01); *H01Q 3/04* (2013.01)

(58) Field of Classification Search
CPC .................................................................
H01Q 3/08; H01Q 3/04; H01Q 3/005;
H01Q 1/1264; H04W 16/28
(Continued)

(56) References Cited

U.S. PATENT DOCUMENTS 6,864,837 B2 * 3/2005 Runyon ................. H01Q 1/246
342/372
8,676,266 B2 * 3/2014 Kim ....................... H01Q 3/005
455/129

(Continued)

FOREIGN PATENT DOCUMENTS

CN   101427418 A   5/2009
CN   102084546 A   6/2011
(Continued)

*Primary Examiner* — Chuong P Nguyen
(74) *Attorney, Agent, or Firm* — Leydig, Voit & Mayer, Ltd.

(57) ABSTRACT

Embodiments of the present application provide an antenna adjustment method, an antenna, and a base station control center, where the antenna includes: a detection unit, configured to detect a current orientation parameter of the antenna; an obtaining unit, configured to obtain remote electrical tilt data of multiple element arrays in the antenna that are corresponding to a target frequency band, where the remote electrical tilt data is determined according to a difference between a target orientation parameter of a beam of the multiple element arrays and the current orientation parameter; and an adjustment unit, configured to adjust an orientation of the beam of the multiple element arrays according to the remote electrical tilt data. According to the embodiments of the present application, multiple element arrays in the antenna that are corresponding to each frequency band can be separately adjusted, thereby improving antenna performance.

10 Claims, 4 Drawing Sheets

(51) Int. Cl.
*H04W 16/28* (2009.01)
*H01Q 1/12* (2006.01)
*H01Q 3/04* (2006.01)

(58) Field of Classification Search
USPC .................................................. 342/359, 372
See application file for complete search history.

(56) References Cited

U.S. PATENT DOCUMENTS

| | | | |
|---|---|---|---|
| 8,766,847 B2 | 7/2014 | Zhao et al. | |
| 9,502,764 B2* | 11/2016 | Au | H01Q 1/246 |
| 9,660,323 B2* | 5/2017 | Au | H01Q 1/1264 |
| 9,972,906 B2* | 5/2018 | Vassilakis | H01Q 1/125 |
| 2003/0160731 A1* | 8/2003 | Wensink | H01Q 1/125 |
| | | | 343/892 |
| 2012/0218159 A1* | 8/2012 | Ke | H01Q 1/246 |
| | | | 343/760 |
| 2016/0020504 A1* | 1/2016 | Michaelis | H01Q 1/125 |
| | | | 342/359 |
| 2018/0287255 A1* | 10/2018 | Zimmerman | H01Q 3/06 |

FOREIGN PATENT DOCUMENTS

| | | |
|---|---|---|
| CN | 102348224 A | 2/2012 |
| CN | 102509902 A | 6/2012 |
| CN | 103840262 A | 6/2014 |
| EP | 2424040 A1 | 2/2012 |

* cited by examiner

ANTENNA ADJUSTMENT METHOD, ANTENNA, AND BASE STATION CONTROL CENTER

CROSS-REFERENCE TO RELATED APPLICATIONS

This application is a continuation of International Application No. PCT/CN2015/073692, filed on Mar. 5, 2015, which claims priority to Chinese Patent Application No. 201410084475.3, filed on Mar. 7, 2014, both of which are hereby incorporated by reference in their entireties.

TECHNICAL FIELD

The present application relates to the communications field, and in particular, to an antenna adjustment method, an antenna, and a base station control center.

BACKGROUND

For a traditional antenna, adjustment of an azimuth and a downtilt generally requires manual and mechanical adjustment at a position in which the antenna is mounted. Because an antenna includes element arrays corresponding to multiple frequency bands, mechanical antenna adjustment may cause both an azimuth and a downtilt of arrays corresponding to each frequency band to be adjusted.

Therefore, in the prior art, when a beam of arrays in the antenna that are corresponding to a frequency band is adjusted, a beam of arrays corresponding to another frequency band is affected, which compromises antenna performance.

SUMMARY

Embodiments of the present application provide an antenna adjustment method, an antenna, and a base station control center, which can separately adjust multiple element arrays in the antenna that are corresponding to each frequency band, and improve antenna performance.

According to a first aspect, an embodiment of the present application provides an antenna, including: a detection unit, configured to detect a current orientation parameter of the antenna; an obtaining unit, configured to obtain remote electrical tilt data of multiple element arrays in the antenna that are corresponding to a target frequency band, where the remote electrical tilt data is determined according to a difference between a target orientation parameter of a beam of the multiple element arrays and the current orientation parameter; and an adjustment unit, configured to adjust an orientation of the beam of the multiple element arrays according to the remote electrical tilt data.

With reference to the first aspect, in a first possible implementation manner, the current orientation parameter includes a current mechanical azimuth, and the target orientation parameter includes a target azimuth; and the adjustment unit is specifically configured to adjust an azimuth of the multiple element arrays according to the remote electrical tilt data.

With reference to the first aspect, in a second possible implementation manner, the current orientation parameter includes a current mechanical downtilt, and the target orientation parameter includes a target downtilt; and the adjustment unit is specifically configured to adjust a downtilt of the multiple element arrays according to the remote electrical tilt data.

With reference to the first aspect, in a third possible implementation manner, the current orientation parameter includes a current mechanical azimuth and a current mechanical downtilt, and the target orientation parameter includes a target azimuth and a target downtilt; the adjustment unit is specifically configured to adjust an azimuth of the multiple element arrays according to the remote electrical tilt data; and the adjustment unit is further configured to adjust a downtilt of the multiple element arrays according to the remote electrical tilt data.

With reference to the first aspect or any one of the first to the third possible implementation manners, in a fourth possible implementation manner, the obtaining unit includes: a sending unit, configured to send the current orientation parameter to a base station control center, so that the base station control center determines the remote electrical tilt data according to the difference between the target orientation parameter of the beam of the multiple element arrays and the current orientation parameter; and a first receiving unit, configured to receive the remote electrical tilt data sent by the base station control center.

With reference to the first aspect or any one of the first to the third possible implementation manners, in a fifth possible implementation manner, the obtaining unit includes: a second receiving unit, configured to receive the target orientation parameter of the multiple element arrays that is sent by a base station control center; a calculation unit, configured to calculate the difference between the target orientation parameter of the multiple element arrays and the current orientation parameter; and a determining unit, configured to determine, according to the difference, the remote electrical tilt data corresponding to the difference.

With reference to the first aspect or any one of the first to the fifth possible implementation manners, in a sixth possible implementation manner, the target frequency band is one of the F band or the A band of Time Division-Synchronous Code Division Multiple Access TD-SCDMA, or the D band of Time Division Long Term Evolution TD-LTE.

According to a second aspect, an embodiment of the present application provides a base station control center, including: an obtaining unit, configured to obtain a current orientation parameter of an antenna; a calculation unit, configured to calculate a difference between a target orientation parameter of multiple element arrays in the antenna that are corresponding to a target frequency band and the current orientation parameter; a determining unit, configured to determine, according to the difference, remote electrical tilt data corresponding to the difference; and a sending unit, configured to send the remote electrical tilt data to the antenna, so that the antenna adjusts an orientation of a beam of the multiple element arrays according to the remote electrical tilt data.

With reference to the second aspect, in a first possible implementation manner, the current orientation parameter includes a current mechanical azimuth, the target orientation parameter includes a target azimuth, and the difference includes a difference between the target azimuth and the current mechanical azimuth; and the determining unit is specifically configured to obtain, from a remote electrical tilt database according to the difference, remote electrical tilt data corresponding to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna.

With reference to the second aspect, in a second possible implementation manner, the current orientation parameter includes a current mechanical downtilt, the target orientation parameter includes a target downtilt, and the difference includes a difference between the target downtilt and the current mechanical downtilt; and the determining unit is specifically configured to generate downtilt remote electrical tilt data according to the difference, where the remote electrical tilt data is used to adjust a downtilt of the multiple element arrays in the antenna that are corresponding to the target frequency band.

With reference to the second aspect, in a third possible implementation manner, the current orientation parameter includes a current mechanical azimuth and a current mechanical downtilt, the target orientation parameter includes a target azimuth and a target downtilt, and the difference includes a difference between the target azimuth and the current mechanical azimuth and a difference between the target downtilt and the current mechanical downtilt; the determining unit is specifically configured to obtain, from a remote electrical tilt database according to the difference between the target azimuth and the current mechanical azimuth, first remote electrical tilt data corresponding to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and the determining unit is specifically configured to generate second remote electrical tilt data according to the difference between the target downtilt and the current mechanical downtilt, where the second remote electrical tilt data is used to adjust a downtilt of the multiple element arrays in the antenna that are corresponding to the target frequency band.

With reference to the second aspect or any one of the first to the third possible implementation manners of the second aspect, in a fourth possible implementation manner, the target frequency band is one of the F band or the A band of Time Division-Synchronous Code Division Multiple Access TD-SCDMA, or the D band of Time Division Long Term Evolution TD-LTE.

According to a third aspect, an embodiment of the present application provides an antenna adjustment method, including: detecting a current orientation parameter of an antenna; obtaining remote electrical tilt data of multiple element arrays in the antenna that are corresponding to a target frequency band, where the remote electrical tilt data is determined according to a difference between a target orientation parameter of a beam of the multiple element arrays and the current orientation parameter; and adjusting an orientation of the beam of the multiple element arrays according to the remote electrical tilt data.

With reference to the third aspect, in a first possible implementation manner, the current orientation parameter includes a current mechanical azimuth, the target orientation parameter includes a target azimuth, and the adjusting an orientation of the beam of the multiple element arrays according to the remote electrical tilt data includes: adjusting an azimuth of the multiple element arrays according to the remote electrical tilt data.

With reference to the third aspect, in a second possible implementation manner, the current orientation parameter includes a current mechanical downtilt, the target orientation parameter includes a target downtilt, and the adjusting an orientation of the beam of the multiple element arrays according to the remote electrical tilt data includes: adjusting a downtilt of the multiple element arrays according to the remote electrical tilt data.

With reference to the third aspect, in a third possible implementation manner, the current orientation parameter includes a current mechanical azimuth and a current mechanical downtilt, the target orientation parameter includes a target azimuth and a target downtilt, and the adjusting an orientation of the beam of the multiple element arrays according to the remote electrical tilt data includes: adjusting an azimuth of the multiple element arrays according to the remote electrical tilt data; and adjusting a downtilt of the multiple element arrays according to the remote electrical tilt data.

With reference to the third aspect or any one of the first to the third possible implementation manners of the third aspect, in a fourth possible implementation manner, the obtaining remote electrical tilt data of multiple element arrays in the antenna that are corresponding to a target frequency band includes: sending the current orientation parameter to a base station control center, so that the base station control center determines the remote electrical tilt data according to the difference between the target orientation parameter of the beam of the multiple element arrays and the current orientation parameter; and receiving the remote electrical tilt data sent by the base station control center.

With reference to the third aspect or any one of the first to the third possible implementation manners of the third aspect, in a fifth possible implementation manner, the obtaining remote electrical tilt data of multiple element arrays in the antenna that are corresponding to a target frequency band includes: receiving the target orientation parameter of the multiple element arrays that is sent by a base station control center; calculating the difference between the target orientation parameter of the multiple element arrays and the current orientation parameter; and determining, according to the difference, the remote electrical tilt data corresponding to the difference.

With reference to the third aspect or any one of the first to the fifth possible implementation manners of the third aspect, in a sixth possible implementation manner, the target frequency band is one of the F band or the A band of Time Division-Synchronous Code Division Multiple Access TD-SCDMA, or the D band of Time Division Long Term Evolution TD-LTE.

According to a fourth aspect, an embodiment of the present application provides an antenna adjustment method, including: obtaining a current orientation parameter of an antenna; calculating a difference between a target orientation parameter of multiple element arrays in the antenna that are corresponding to a target frequency band and the current orientation parameter; determining, according to the difference, remote electrical tilt data corresponding to the difference; and sending the remote electrical tilt data to the antenna, so that the antenna adjusts an orientation of a beam of the multiple element arrays according to the remote electrical tilt data.

With reference to the fourth aspect, in a first possible implementation manner, the current orientation parameter includes a current mechanical azimuth, the target orientation parameter includes a target azimuth, the difference includes a difference between the target azimuth and the current mechanical azimuth, and the determining, according to the difference, remote electrical tilt data corresponding to the difference includes: obtaining, from a remote electrical tilt database according to the difference, the remote electrical tilt data corresponding to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna.

With reference to the fourth aspect, in a second possible implementation manner, the current orientation parameter includes a current mechanical downtilt, the target orientation parameter includes a target downtilt, the difference includes a difference between the target downtilt and the current mechanical downtilt, and the determining, according to the difference, remote electrical tilt data corresponding to the difference includes: generating downtilt remote electrical tilt data according to the difference, where the remote electrical tilt data is used to adjust a downtilt of the multiple element arrays in the antenna that are corresponding to the target frequency band.

With reference to the fourth aspect, in a third possible implementation manner, the current orientation parameter includes a current mechanical azimuth and a current mechanical downtilt, the target orientation parameter includes a target azimuth and a target downtilt, the difference includes a difference between the target azimuth and the current mechanical azimuth and a difference between the target downtilt and the current mechanical downtilt, and the determining, according to the difference, remote electrical tilt data corresponding to the difference includes: obtaining, from a remote electrical tilt database according to the difference between the target azimuth and the current mechanical azimuth, first remote electrical tilt data corresponding to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and generating second remote electrical tilt data according to the difference between the target downtilt and the current mechanical downtilt, where the second remote electrical tilt data is used to adjust a downtilt of the multiple element arrays in the antenna that are corresponding to the target frequency band.

With reference to the fourth aspect or any one of the first to the third possible implementation manners of the fourth aspect, in a fourth possible implementation manner, the target frequency band is one of the F band or the A band of Time Division-Synchronous Code Division Multiple Access TD-SCDMA, or the D band of Time Division Long Term Evolution TD-LTE.

Based on the foregoing technical solutions, in the embodiments of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and an orientation of the beam of the arrays is adjusted according to the remote electrical tilt data. Multiple element arrays in the antenna that are corresponding to each frequency band can be separately adjusted, and a beam of arrays corresponding to another frequency band is not affected, thereby improving antenna performance.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that the technical solutions of the embodiments of the present application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), an Universal Mobile Telecommunications System (UMTS), or a Worldwide Interoperability for Microwave Access (WiMAX) communications system.

The embodiments of the present application may be applied to radio networks with different standards. A radio access network may include different network elements in different systems. For example, network elements of a radio access network in the LTE and LTE-A include an evolved NodeB (eNodeB, eNB), and network elements of a radio access network in the WCDMA include a Radio Network Controller (RNC) and a NodeB. Similarly, other radio networks such as the WiMAX may also use solutions similar to those in the embodiments of the present application, and the only difference is that the related modules in a base station system may be different. No limitation is set by the embodiments of the present application. However, for ease of description, base stations in the following embodiments are described by using an eNodeB and a NodeB as examples.

Figure 1:
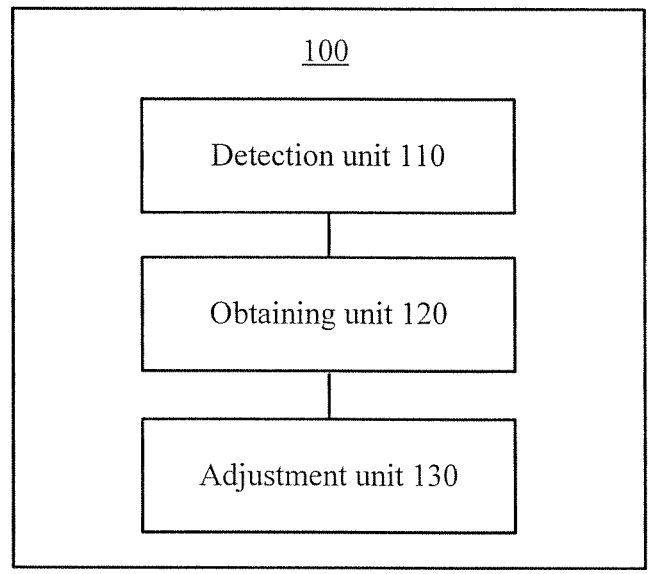
FIG. 1 is a schematic block diagram of an antenna according to an embodiment of the present application.

FIG. 1 is a schematic block diagram of an antenna according to an embodiment of the present application. An antenna 100 shown in FIG. 1 includes a detection unit 110, an obtaining unit 120, and an adjustment unit 130.

Specifically, the detection unit 110 is configured to detect a current orientation parameter of the antenna. For example, the detection unit is a sensing module, and the antenna device detects the current orientation parameter of the antenna device by using the sensing module. The current orientation parameter of the antenna may include a current mechanical azimuth or a current mechanical downtilt of the antenna, or both a current mechanical azimuth and a current mechanical downtilt of the antenna. The obtaining unit 120 is configured to obtain remote electrical tilt data of multiple element arrays in the antenna that are corresponding to a target frequency band, where the remote electrical tilt data is determined according to a difference between a target orientation parameter of a beam of the multiple element arrays and the current orientation parameter. The adjustment unit 130 is configured to adjust an orientation of the beam of the multiple element arrays according to the remote electrical tilt data.

In other words, in this embodiment of the present application, the orientation of the arrays corresponding to the target frequency band may be adjusted according to the remote electrical tilt data, and arrays corresponding to different frequency bands are adjusted individually, so that another array may not be affected.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and an orientation of the beam of the arrays is adjusted according to the remote electrical tilt data. Multiple element arrays in the antenna that are corresponding to each frequency band can be separately adjusted, and a beam of arrays corresponding to another frequency band is not affected, thereby improving antenna performance.

It should be understood that the antenna in this embodiment of the present application is a multi-band antenna and includes multiple element arrays, and the multi-band antenna can simultaneously work in multiple frequency bands, where each frequency band is corresponding to at least two element arrays in the antenna.

It should be understood that the target frequency band in this embodiment of the present application may be one of the F band (1880 MHz-1920 MHz) or the A band (2010 MHz-2025 MHz) of Time Division-Synchronous Code Division Multiple Access TD-SCDMA, or the D band (2500 MHz-2690 MHz) of Time Division Long Term Evolution TD-LTE; or may be a frequency band in GSM or CDMA, which is not limited in this embodiment of the present application.

It should be understood that an orientation parameter may include only an azimuth or a downtilt, or may include both an azimuth and a downtilt, which is not limited in this embodiment of the present application. That is, in this embodiment of the application, only an azimuth or a downtilt of the arrays corresponding to the target frequency band may be adjusted, or both an azimuth and a downtilt of the arrays corresponding to the target frequency band may be adjusted.

The current orientation parameter of the antenna that is detected by the detection unit 110 refers to an orientation parameter of the entire antenna, that is, the current orientation parameter of the antenna that includes the multiple element arrays is a mechanical parameter. In other words, the current orientation parameter is a current mechanical orientation parameter, and may include the current mechanical azimuth or the current mechanical downtilt of the antenna or both the current mechanical azimuth and the current mechanical downtilt of the antenna.

It should further be understood that the target orientation parameter is an orientation parameter of the multiple element arrays in the antenna that are corresponding to the target frequency band, that is, the target orientation parameter is described in terms of multiple element arrays in the antenna that are corresponding to a frequency band. The target orientation parameter may include a target azimuth or a target downtilt, or may include both a target azimuth and a target downtilt. It should be understood that the target azimuth refers to an azimuth of the beam of the multiple element arrays corresponding to the target frequency band, and the azimuth of the beam may be adjusted by adjusting a phase of the multiple corresponding element arrays. The target downtilt refers to a downtilt of the beam of the multiple element arrays corresponding to the target frequency band, and the downtilt may be adjusted by adjusting the multiple corresponding element arrays by using an electrical engine.

Optionally, in another embodiment, the adjustment unit 130 is specifically configured to adjust an azimuth of the arrays according to the remote electrical tilt data when the current orientation parameter includes a current mechanical azimuth and the target orientation parameter includes a target azimuth.

Alternatively, in another embodiment, the adjustment unit 130 is specifically configured to adjust a downtilt of the arrays according to the remote electrical tilt data when the current orientation parameter includes a current mechanical downtilt and the target orientation parameter includes a target downtilt.

Alternatively, in another embodiment, the adjustment unit 130 is specifically configured to adjust an azimuth of the arrays according to azimuth weight remote electrical tilt data and adjust a downtilt of the arrays according to downtilt remote electrical tilt data when the current orientation parameter includes a current mechanical azimuth and a current mechanical downtilt and the target orientation parameter includes a target azimuth and a target downtilt.

Optionally, the remote electrical tilt data may be sent to the antenna device by a base station control center, or may be generated by the antenna device itself.

Correspondingly, in another embodiment, when the remote electrical tilt data is sent to the antenna device by the base station control center, the obtaining unit 120 is specifically configured to send the current orientation parameter to the base station control center and receive the remote electrical tilt data sent by the base station control center. Specifically, the obtaining unit 120 is specifically configured to send the current orientation parameter to the base station control center; the base station control center performs a subtraction operation between the target orientation parameter of the arrays in the antenna that are corresponding to the target frequency band and the current orientation parameter, and the base station control center may obtain, from a remote electrical tilt database of the base station control center, the remote electrical tilt data corresponding to the difference between the target orientation parameter and the current orientation parameter, where the remote electrical tilt database includes azimuth weight data corresponding to each frequency band of the antenna; or the base station control center may calculate the remote electrical tilt data according to the difference between the target orientation parameter and the current orientation parameter; and the base station control center sends the remote electrical tilt data to the antenna. The obtaining unit 120 is specifically configured to receive the remote electrical tilt data sent by the base station control center.

Alternatively, in another embodiment, when the remote electrical tilt data is generated by the antenna device itself, the obtaining unit 120 is specifically configured to: receive the target orientation parameter of the multiple element arrays that is sent by the base station control center; calculate the difference between the target orientation parameter of the multiple element arrays and the current orientation parameter; and determine, according to the difference, the remote electrical tilt data corresponding to the difference.

Specifically, the obtaining unit 120 is configured to perform a subtraction operation between the target orientation parameter of the arrays corresponding to the target frequency band and the current orientation parameter, and obtain, from a storage module of the antenna, the remote electrical tilt data corresponding to the difference between the target orientation parameter and the current orientation parameter, where the storage module includes azimuth weight data corresponding to each frequency band of the antenna; or the obtaining unit 120 is specifically configured to calculate the remote electrical tilt data according to the difference between the target orientation parameter and the current orientation parameter.

Specifically, in another embodiment, when the current orientation parameter includes a current mechanical azimuth, and the target orientation parameter includes a target azimuth, the difference includes a difference between the target azimuth and the current mechanical azimuth. The obtaining unit 120 is specifically configured to obtain, from a remote electrical tilt database of the antenna according to the difference, the azimuth weight remote electrical tilt data corresponding to the azimuth difference, where the remote electrical tilt data is used to adjust an azimuth of the multiple element arrays in the antenna that are corresponding to the target frequency band, and the remote electrical tilt database includes azimuth weight data corresponding to each frequency band of the antenna. It should be understood that the azimuth weight remote electrical tilt data is data in terms of deflection of the azimuth of the arrays in the antenna that are corresponding to the target frequency band, such as weight data of 5°, 10°, or 15° clockwise deflection or 5°, 10°, or 15° counterclockwise deflection.

Specifically, in another embodiment, when the current orientation parameter includes a current mechanical downtilt, and the target orientation parameter includes a target downtilt, the difference includes a difference between the target downtilt and the current mechanical downtilt, and the obtaining unit 120 is specifically configured to generate the downtilt remote electrical tilt data according to the difference, where the remote electrical tilt data is used to adjust a downtilt of the multiple element arrays in the antenna that are corresponding to the target frequency band.

Specifically, in another embodiment, when the current orientation parameter includes a current mechanical azimuth and a current mechanical downtilt, and the target orientation parameter includes a target azimuth and a target downtilt, the difference includes a difference between the target azimuth and the current mechanical azimuth and a difference between the target downtilt and the current mechanical downtilt; the obtaining unit 120 is specifically configured to obtain, from a remote electrical tilt database of the antenna according to the difference between the target azimuth and the current mechanical azimuth, first remote electrical tilt data corresponding to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and the obtaining unit 120 is specifically configured to generate second remote electrical tilt data according to the difference between the target downtilt and the current mechanical downtilt, where the second remote electrical tilt data is used to adjust a downtilt of the multiple element arrays in the antenna that are corresponding to the target frequency band.

Figure 2:
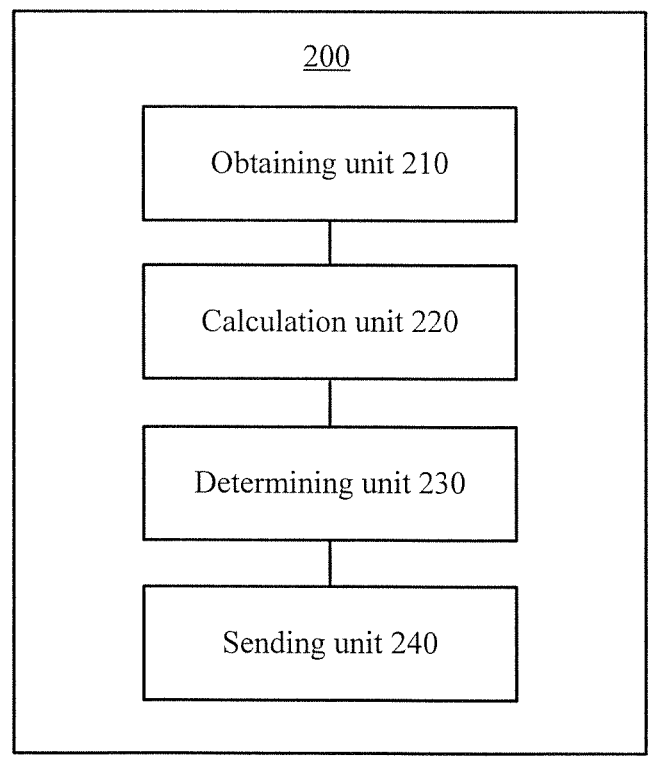
FIG. 2 is a schematic block diagram of a control center according to an embodiment of the present application.

The foregoing describes in detail an adjustment antenna according to an embodiment of the present application with reference to FIG. 1, and the following describes a base station control center according to an embodiment of the present application with reference to FIG. 2.

FIG. 2 is a schematic block diagram of a control center according to an embodiment of the present application. A control center 200 shown in FIG. 2 includes an obtaining unit 210, a calculation unit 220, a determining unit 230, and a sending unit 240.

Specifically, the obtaining unit 210 is configured to obtain a current orientation parameter of an antenna. Further, the obtaining unit 210 is specifically configured to receive the current orientation parameter sent by the antenna, where the current orientation parameter may be obtained by a detection unit of the antenna by means of detection. The calculation unit 220 is configured to calculate a difference between a target orientation parameter of multiple element arrays in the antenna that are corresponding to a target frequency band and the current orientation parameter. The determining unit 230 is configured to determine, according to the difference, remote electrical tilt data corresponding to the difference. The sending unit 240 is configured to send the remote electrical tilt data to the antenna, so that the antenna adjusts an orientation of a beam of the multiple element arrays according to the remote electrical tilt data.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and the remote electrical tilt data is sent to the antenna, so that the antenna adjusts an orientation of the beam of the multiple element arrays according to the remote electrical tilt data. Multiple element arrays in the antenna that are corresponding to each frequency band can be separately adjusted, and a beam of arrays corresponding to another frequency band is not affected, thereby improving antenna performance.

It should be understood that the target frequency band in this embodiment of the present application may be one of the F band (1880 MHz-1920 MHz) or the A band (2010 MHz-2025 MHz) of Time Division-Synchronous Code Division Multiple Access TD-SCDMA, or the D band (2500 MHz-2690 MHz) of Time Division Long Term Evolution TD-LTE; or may be a frequency band in GSM or CDMA, which is not limited in this embodiment of the present application.

It should further be understood that an orientation parameter may include only an azimuth or a downtilt, or may include both an azimuth and a downtilt, which is not limited in this embodiment of the present application. That is, in this embodiment of the application, only an azimuth or a downtilt of the arrays corresponding to the target frequency band may be adjusted, or both an azimuth and a downtilt of the arrays corresponding to the target frequency band may be adjusted.

Correspondingly, in another embodiment, when the current orientation parameter includes a current mechanical azimuth, and the target orientation parameter includes a target azimuth, the difference includes an azimuth difference, where the difference includes a difference between the target azimuth and the current mechanical azimuth; and the determining unit 230 may be specifically configured to obtain, from a remote electrical tilt database according to the difference, remote electrical tilt data corresponding to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna.

Alternatively, in another embodiment, when the current orientation parameter includes a current mechanical downtilt, and the target orientation parameter includes a target downtilt, the difference includes a difference between the target downtilt and the current mechanical downtilt, and the determining unit 230 may be specifically configured to generate downtilt remote electrical tilt data according to the difference, where the remote electrical tilt data is used to adjust a downtilt of the multiple element arrays in the antenna that are corresponding to the target frequency band.

Alternatively, in another embodiment, when the current orientation parameter includes a current mechanical azimuth and a current mechanical downtilt, and the target orientation parameter includes a target azimuth and a target downtilt, the difference includes a difference between the target azimuth and the current mechanical azimuth and a difference between the target downtilt and the current mechanical downtilt; the determining unit 230 may be specifically configured to obtain, from a remote electrical tilt database according to the difference between the target azimuth and the current mechanical azimuth, first remote electrical tilt data corresponding to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and the determining unit 230 may be further specifically configured to generate second remote electrical tilt data according to the difference between the target downtilt and the current mechanical downtilt, where the second remote electrical tilt data is used to adjust a downtilt of the multiple element arrays in the antenna that are corresponding to the target frequency band.

The foregoing describes in detail an adjustment antenna according to an embodiment of the present application with reference to FIG. 1, and describes in detail a base station control center according to an embodiment of the present application with reference to FIG. 2. The following describes in detail an antenna adjustment method according to an embodiment of the present application with reference to FIG. 3 to FIG. 5.

Figure 3:
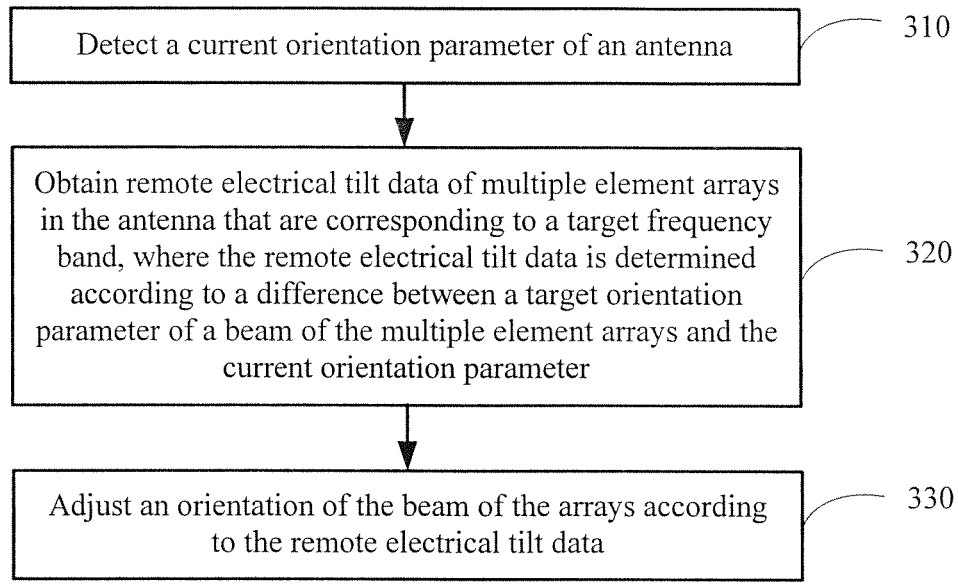
FIG. 3 is a schematic flowchart of an antenna adjustment method according to an embodiment of the present application.
Figure 4:
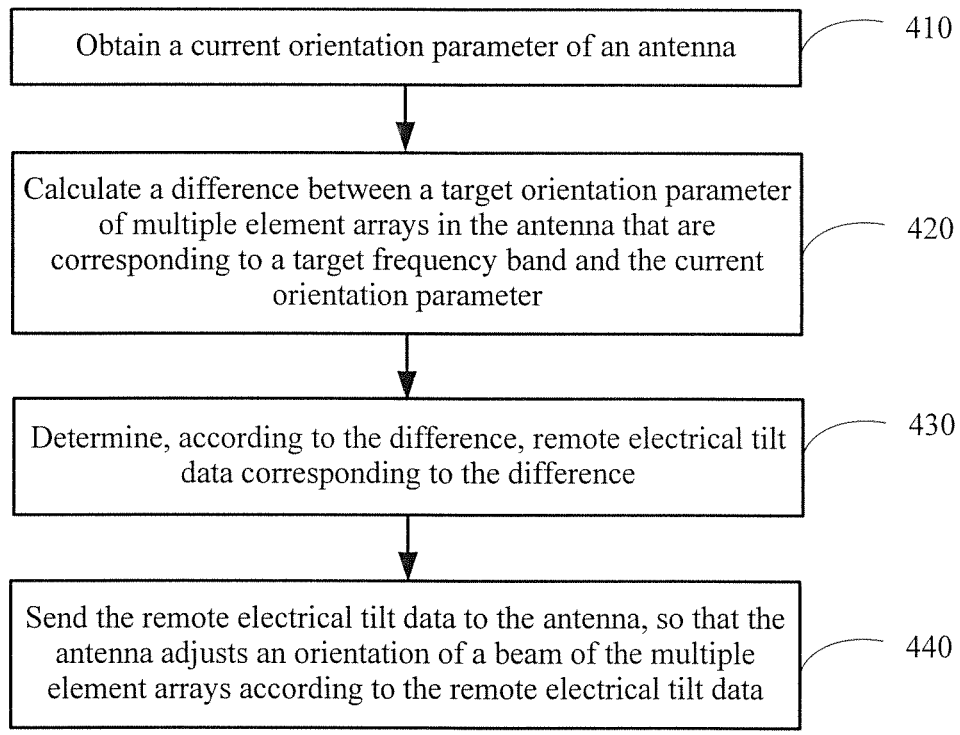
FIG. 4 is a schematic flowchart of an antenna adjustment method according to another embodiment of the present application.

Specifically, with reference to FIG. 3, an antenna adjustment method according to an embodiment of the present application is described in detail from a perspective of an antenna. With reference to FIG. 4, an antenna adjustment method according to an embodiment of the present application is described from a perspective of a base station control center.

FIG. 3 is a schematic flowchart of an antenna adjustment method according to an embodiment of the present application. The method shown in FIG. 3 is executed by an antenna, and the corresponding method is completed by corresponding units shown in FIG. 1. As shown in FIG. 3, the method includes:

310. Detect a current orientation parameter of the antenna.

Specifically, the antenna device detects the current orientation parameter of the antenna device by using a sensing module. The current orientation parameter of the antenna may include a current mechanical azimuth or a current mechanical downtilt of the antenna, or both a current mechanical azimuth and a current mechanical downtilt of the antenna.

320. Obtain remote electrical tilt data of multiple element arrays in the antenna that are corresponding to a target frequency band, where the remote electrical tilt data is determined according to a difference between a target orientation parameter of a beam of the multiple element arrays and the current orientation parameter.

330. Adjust an orientation of the beam of the arrays according to the remote electrical tilt data.

In other words, in this embodiment of the present application, the orientation of the arrays corresponding to the target frequency band may be adjusted according to the remote electrical tilt data, and arrays corresponding to different frequency bands are adjusted individually, so that another array may not be affected.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and an orientation of the beam of the arrays is adjusted according to the remote electrical tilt data. Multiple element arrays in the antenna that are corresponding to each frequency band can be separately adjusted, and a beam of arrays corresponding to another frequency band is not affected, thereby improving antenna performance.

It should be understood that the antenna in this embodiment of the present application is a multi-band antenna and includes multiple element arrays, and the multi-band antenna can simultaneously work in multiple frequency bands, where each frequency band is corresponding to at least two element arrays in the antenna.

It should be understood that the target frequency band in this embodiment of the present application may be one of the F band (1880 MHz-1920 MHz) or the A band (2010 MHz-2025 MHz) of Time Division-Synchronous Code Division Multiple Access TD-SCDMA, or the D band (2500 MHz-2690 MHz) of Time Division Long Term Evolution TD-LTE; or may be a frequency band in GSM or CDMA, which is not limited in this embodiment of the present application.

It should be understood that an orientation parameter may include only an azimuth or a downtilt, or may include both an azimuth and a downtilt, which is not limited in this embodiment of the present application. That is, in this embodiment of the application, only an azimuth or a downtilt of the arrays corresponding to the target frequency band may be adjusted, or both an azimuth and a downtilt of the arrays corresponding to the target frequency band may be adjusted.

It should further be understood that the current orientation parameter of the antenna in step 310 refers to an orientation parameter of the entire antenna, that is, the current orientation parameter of the antenna that includes the multiple element arrays is a mechanical parameter. In other words, the current orientation parameter is a current mechanical orientation parameter, and may include the current mechanical azimuth or the current mechanical downtilt of the antenna or both the current mechanical azimuth and the current mechanical downtilt of the antenna.

It should further be understood that the target orientation parameter in step 320 is an orientation parameter of the multiple element arrays in the antenna that are corresponding to the target frequency band, that is, the target orientation parameter is described in terms of multiple element arrays in the antenna that are corresponding to a frequency band. The target orientation parameter may include a target azimuth or a target downtilt, or may include both a target azimuth and a target downtilt. It should be understood that the target azimuth refers to an azimuth of the beam of the multiple element arrays corresponding to the target frequency band, and the azimuth of the beam may be adjusted by adjusting a phase of the multiple corresponding element arrays. The target downtilt refers to a downtilt of the beam of the multiple element arrays corresponding to the target frequency band, and the downtilt may be adjusted by adjusting the multiple corresponding element arrays by using an electrical engine.

Optionally, in another embodiment, when the current orientation parameter includes a current mechanical azimuth, and the target orientation parameter includes a target azimuth, in step 330, an azimuth of the arrays may be adjusted according to the remote electrical tilt data.

Alternatively, in another embodiment, when the current orientation parameter includes a current mechanical downtilt, and the target orientation parameter includes a target downtilt, in step 330, a downtilt of the arrays may be adjusted according to the remote electrical tilt data.

Alternatively, in another embodiment, when the current orientation parameter includes a current mechanical azimuth and a current mechanical downtilt, and the target orientation parameter includes a target azimuth and a target downtilt, in step 330, an azimuth of the arrays may be adjusted according to azimuth weight remote electrical tilt data, and a downtilt of the arrays may further be adjusted according to downtilt remote electrical tilt data.

Optionally, the remote electrical tilt data in step 320 may be sent to the antenna device by a base station control center, or may be generated by the antenna device itself.

Correspondingly, in another embodiment, when the remote electrical tilt data is sent to the antenna device by the base station control center, the method includes: sending the current orientation parameter to the base station control center; and receiving the remote electrical tilt data sent by the base station control center. Specifically, the current orientation parameter is sent to the base station control center; the base station control center performs a subtraction operation between the target orientation parameter of the arrays in the antenna that are corresponding to the target frequency band and the current orientation parameter, and the base station control center may obtain, from a remote electrical tilt database of the base station control center, the remote electrical tilt data corresponding to the difference between the target orientation parameter and the current orientation parameter, where the remote electrical tilt database includes azimuth weight data corresponding to each frequency band of the antenna; or the base station control center may calculate the remote electrical tilt data according to the difference between the target orientation parameter and the current orientation parameter; and the base station control center sends the remote electrical tilt data to the antenna.

Alternatively, in another embodiment, when the remote electrical tilt data is generated by the antenna device itself, the method further includes: receiving the target orientation parameter of the arrays that is sent by the base station control center; calculating a difference between the target orientation parameter of the arrays and the current orientation parameter; and determining, according to the difference, the remote electrical tilt data corresponding to the difference. Specifically, the antenna performs a subtraction operation between the target orientation parameter of the arrays corresponding to the target frequency band and the current orientation parameter, and the antenna may obtain, from a storage module of the antenna, the remote electrical tilt data corresponding to the difference between the target orientation parameter and the current orientation parameter, where the storage module includes azimuth weight data corresponding to each frequency band of the antenna; or the antenna may calculate the remote electrical tilt data according to the difference between the target orientation parameter and the current orientation parameter.

Specifically, in another embodiment, when the current orientation parameter includes a current mechanical azimuth, and the target orientation parameter includes a target azimuth, the difference includes a difference between the target azimuth and the current mechanical azimuth, and in step 330, the azimuth weight remote electrical tilt data corresponding to the azimuth difference may be obtained from a remote electrical tilt database of the antenna according to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna. It should be understood that the azimuth weight remote electrical tilt data is data in terms of deflection of the azimuth of the arrays in the antenna that are corresponding to the target frequency band, such as weight data of 5°, 10°, or 15° clockwise deflection or 5°, 10°, or 15° counterclockwise deflection.

Specifically, in another embodiment, when the current orientation parameter includes a current mechanical downtilt, and the target orientation parameter includes a target downtilt, the difference includes a difference between the target downtilt and the current mechanical downtilt, and in step 330, the downtilt remote electrical tilt data may be generated according to the difference, where the remote electrical tilt data is used to adjust a downtilt of the multiple element arrays in the antenna that are corresponding to the target frequency band.

Specifically, in another embodiment, when the current orientation parameter includes a current mechanical azimuth and a current mechanical downtilt, and the target orientation parameter includes a target azimuth and a target downtilt, the difference includes a difference between the target azimuth and the current mechanical azimuth and a difference between the target downtilt and the current mechanical downtilt; in step 330, first remote electrical tilt data corresponding to the difference between the target azimuth and the current mechanical azimuth may be obtained from a remote electrical tilt database of the antenna according to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and second remote electrical tilt data may further be generated according to the difference between the target downtilt and the current mechanical downtilt, where the second remote electrical tilt data is used to adjust a downtilt of the multiple element arrays in the antenna that are corresponding to the target frequency band.

With reference to FIG. 3, the foregoing describes in detail an antenna adjustment method according to an embodiment of the present application from a perspective of an antenna, and with reference to FIG. 4, the following describes an antenna adjustment method according to an embodiment of the present application from a perspective of a base station control center.

It should be understood that an antenna control method shown in FIG. 4 and described from a base station control center side according to this embodiment of the present application is corresponding to an antenna control method shown in FIG. 3 and described from an antenna side. A repeated description is properly omitted for brevity.

FIG. 4 is a schematic flowchart of an antenna adjustment method according to another embodiment of the present application. The method shown in FIG. 4 is executed by a base station control center, and the corresponding method is completed by corresponding units shown in FIG. 2. As shown in FIG. 4, the method includes:

410. Obtain a current orientation parameter of an antenna.

Specifically, the base station control center receives the current orientation parameter sent by the antenna, where the current orientation parameter may be obtained by a sensing module of the antenna by means of detection.

420. Calculate a difference between a target orientation parameter of multiple element arrays in the antenna that are corresponding to a target frequency band and the current orientation parameter.

430. Determine, according to the difference, remote electrical tilt data corresponding to the difference.

440. Send the remote electrical tilt data to the antenna, so that the antenna adjusts an orientation of a beam of the multiple element arrays according to the remote electrical tilt data.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and the remote electrical tilt data is sent to the antenna, so that the antenna adjusts an orientation of the beam of the multiple element arrays according to the remote electrical tilt data. Multiple element arrays in the antenna that are corresponding to each frequency band can be separately adjusted, and a beam of arrays corresponding to another frequency band is not affected, thereby improving antenna performance.

It should be understood that the target frequency band in this embodiment of the present application may be one of the F band (1880 MHz-1920 MHz) or the A band (2010 MHz-2025 MHz) of Time Division-Synchronous Code Division Multiple Access TD-SCDMA, or the D band (2500 MHz-2690 MHz) of Time Division Long Term Evolution TD-LTE; or may be a frequency band in GSM or CDMA, which is not limited in this embodiment of the present application.

It should further be understood that an orientation parameter may include only an azimuth or a downtilt, or may include both an azimuth and a downtilt, which is not limited in this embodiment of the present application. That is, in this embodiment of the application, only an azimuth or a downtilt of the arrays corresponding to the target frequency band may be adjusted, or both an azimuth and a downtilt of the arrays corresponding to the target frequency band may be adjusted.

Correspondingly, in another embodiment, when the current orientation parameter includes a current mechanical azimuth, and the target orientation parameter includes a target azimuth, the difference includes an azimuth difference, where the difference includes a difference between the target azimuth and the current mechanical azimuth, and in step 430, remote electrical tilt data corresponding to the difference may be obtained from a remote electrical tilt database according to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna.

Alternatively, in another embodiment, when the current orientation parameter includes a current mechanical downtilt, and the target orientation parameter includes a target downtilt, the difference includes a difference between the target downtilt and the current mechanical downtilt, and in step 430, downtilt remote electrical tilt data may be generated according to the difference, where the remote electrical tilt data is used to adjust a downtilt of the multiple element arrays in the antenna that are corresponding to the target frequency band.

Alternatively, in another embodiment, when the current orientation parameter includes a current mechanical azimuth and a current mechanical downtilt, and the target orientation parameter includes a target azimuth and a target downtilt, the difference includes a difference between the target azimuth and the current mechanical azimuth and a difference between the target downtilt and the current mechanical downtilt; in step 430, first remote electrical tilt data corresponding to the difference between the target azimuth and the current mechanical azimuth may be obtained from a remote electrical tilt database according to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna; and in step 430, second remote electrical tilt data may further be generated according to the difference between the target downtilt and the current mechanical downtilt, where the second remote electrical tilt data is used to adjust a downtilt of the multiple element arrays in the antenna that are corresponding to the target frequency band.

Figure 5:
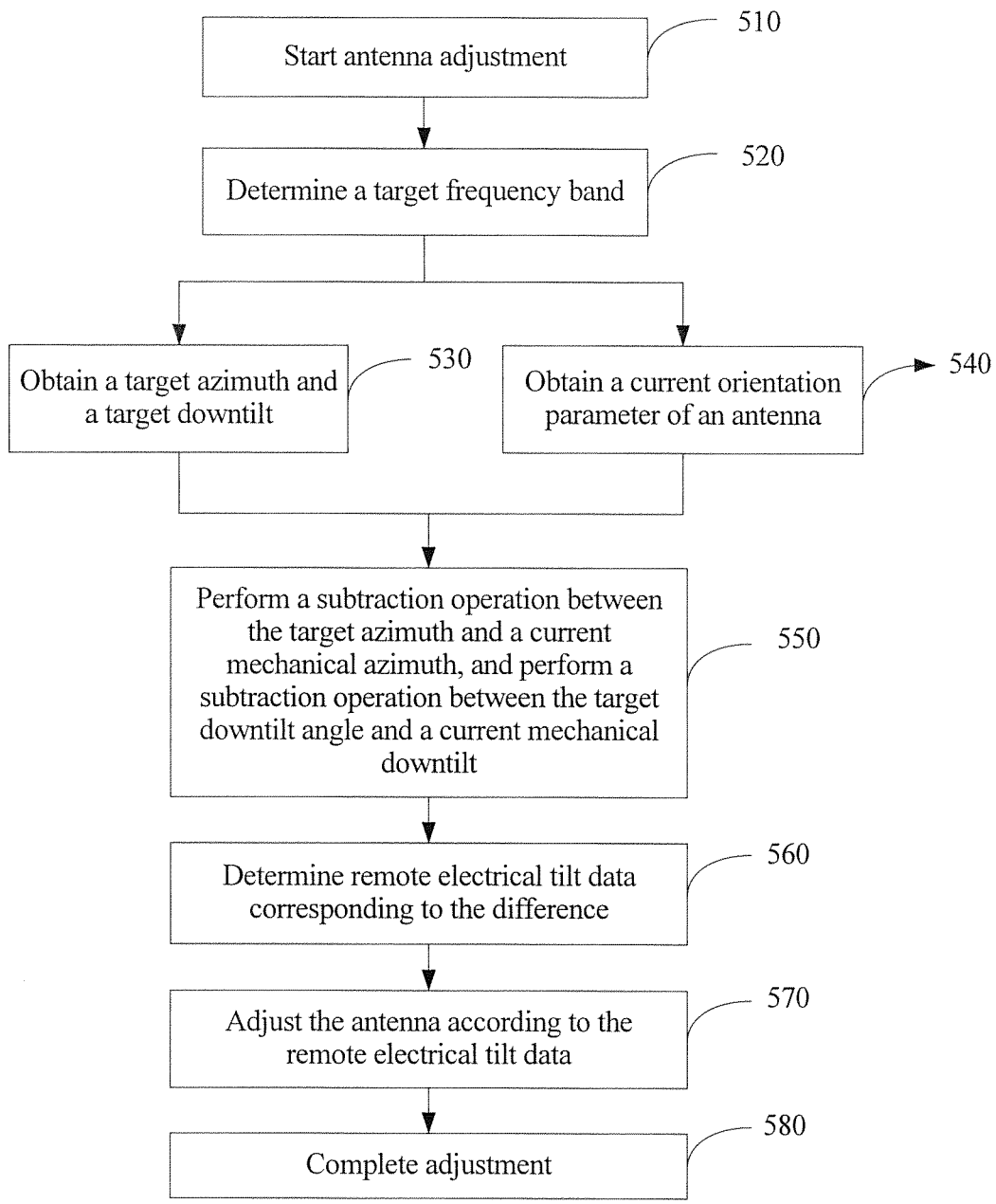
FIG. 5 is a schematic flowchart of an antenna adjustment method according to still another embodiment of the present application.

The following describes in more detail an antenna adjustment method according to an embodiment of the present application with reference to a specific example in FIG. 5. It should be noted that examples shown in FIG. 3 and FIG. 4 are merely intended to help a person skilled in the art understand the embodiments of the present application, instead of limiting the embodiments of the present application to a specific value or a specific scenario in the examples. A person skilled in the art certainly can make various equivalent modifications or changes according to the examples given in FIG. 3 and FIG. 4, and such modifications or changes also fall within the protection scope of the embodiments of the present application.

FIG. 5 is a schematic flowchart of an antenna adjustment method according to still another embodiment of the present application. FIG. 5 is a specific implementation example in the present application, and the embodiment in FIG. 5 is corresponding to the embodiments in FIG. 3 and FIG. 4 in the embodiment of the present application. Detailed descriptions are properly omitted herein.

As shown in FIG. 5, the method is applied in a TD-SCDWA network scenario. To optimize the network according to an actual requirement, an antenna of a base station needs to be adjusted, and a corresponding target frequency band in this scenario is the F band. It should be noted that in this embodiment of the present application, an azimuth or a downtilt or both an azimuth and a downtilt of arrays corresponding to the target frequency band may be adjusted, which is not limited in this embodiment of the present application. In the method shown in FIG. 5, an example of adjusting the azimuth and the downtilt of the arrays in the antenna that are corresponding to the F band is given, and the method shown in FIG. 5 includes the following content:

510. Start antenna adjustment.

Specifically, it may be that adjustment of the azimuth and the downtilt of the antenna is started.

520. Determine a target frequency band.

Specifically, the F band is determined as the target frequency band according to the TD-SCDWA network that needs to be optimized.

530. Obtain a target azimuth and a target downtilt.

Specifically, a target azimuth and a target downtilt of the arrays in the antenna that are corresponding to the F band are determined. In other words, a target azimuth and a target downtilt of an antenna that needs to be adjusted are determined according to an actual requirement.

540. Obtain a current orientation parameter of the antenna.

In other words, a current mechanical azimuth and a current mechanical downtilt of the arrays in the antenna that are corresponding to the F band are obtained. Specifically, the current mechanical azimuth and the current mechanical downtilt of the arrays in the antenna that are corresponding to the F band are obtained by using a sensing module of the antenna.

Further, in a first implementation manner, a base station control center obtains, by using the sensing module of the antenna, the current mechanical azimuth and the current mechanical downtilt of the arrays in the antenna that are corresponding to the F band. In a second implementation manner, the antenna obtains, by using the sensing module of the antenna, the current mechanical azimuth and the current mechanical downtilt of the arrays in the antenna that are corresponding to the F band.

550. Perform a subtraction operation between the target azimuth and a current mechanical azimuth, and perform a subtraction operation between the target downtilt and a current mechanical downtilt.

In other words, an azimuth difference is obtained by performing the subtraction operation between the target azimuth and the current mechanical azimuth, and a downtilt difference is obtained by performing the subtraction operation between the target downtilt and the current mechanical downtilt.

Specifically, corresponding to the first implementation manner in step 540, the base station control center performs the subtraction operation between the target azimuth and the current mechanical azimuth to obtain the azimuth difference, and performs the subtraction operation between the target downtilt and the current mechanical downtilt to obtain the downtilt difference. Corresponding to the second implementation manner in step 540, the antenna performs the subtraction operation between the target azimuth and the current mechanical azimuth to obtain the azimuth difference, and performs the subtraction operation between the target downtilt and the current mechanical downtilt to obtain the downtilt difference.

560. Determine remote electrical tilt data corresponding to the difference.

In other words, azimuth weight remote electrical tilt data corresponding to the azimuth difference is determined, and downtilt remote electrical tilt data corresponding to the downtilt difference is determined.

Specifically, corresponding to the first implementation manner in step 540, the base station control center obtains, from a remote electrical tilt database of the base station control center, the azimuth weight remote electrical tilt data corresponding to the azimuth difference, where the remote electrical tilt database includes azimuth weight data corresponding to each frequency band of the antenna; and the base station control center determines, according to the downtilt difference, the downtilt remote electrical tilt data. Corresponding to the second implementation manner in step 540, the antenna obtains, from a storage module of the antenna, the azimuth weight remote electrical tilt data corresponding to the azimuth difference, and the antenna determines the downtilt remote electrical tilt data according to the downtilt difference.

570. Adjust the antenna according to the remote electrical tilt data.

In other words, the azimuth and the downtilt of the arrays in the antenna that are corresponding to the F band are adjusted according to the remote electrical tilt data.

Specifically, corresponding to the first implementation manner in step 540, the base station control center sends the remote electrical tilt data to the antenna, and the antenna adjusts the azimuth of the arrays according to the azimuth weight remote electrical tilt data, and adjusts the downtilt of the arrays according to the downtilt remote electrical tilt data. Corresponding to the second implementation manner in step 540, the antenna adjusts the azimuth of the arrays according to the azimuth weight remote electrical tilt data, and adjusts the downtilt of the arrays according to the downtilt remote electrical tilt data.

580. Complete adjustment.

It should be noted that the example shown in FIG. 5 is intended to help a person skilled in the art better understand the embodiments of the present application, instead of limiting the scope of the embodiments of the present application. A person skilled in the art can certainly perform various equivalent modification or variation according to the example given in FIG. 5, and such modification or variation also falls within the scope of the embodiments of the present application.

It should be understood that sequence numbers in the foregoing processes do not indicate execution sequences. Execution sequences of the processes should be determined according to functions and internal logic of the processes, and shall not constitute any limitation on implementation processes of the embodiments of the present application.

Figure 6:
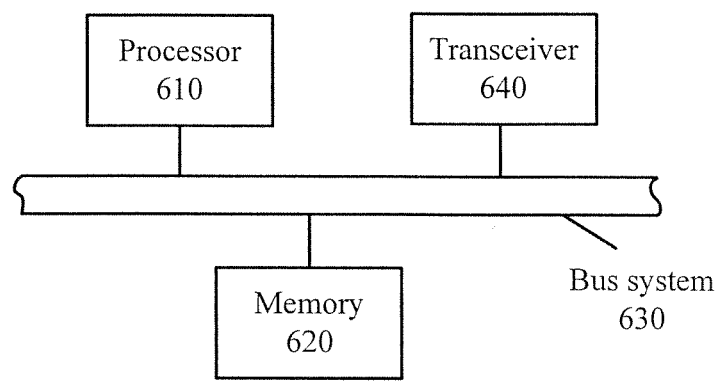
FIG. 6 is a schematic block diagram of an antenna according to another embodiment of the present application.

FIG. 6 is a schematic block diagram of an antenna according to another embodiment of the present application. An antenna 600 shown in FIG. 6 includes a processor 610, a memory 620, a bus system 630, and a transceiver 640. The processor 610, the memory 620, and the transceiver 640 are connected to each other by using the bus system 630.

Specifically, the processor 610 is configured to invoke, by using the bus system 630, code stored in the memory 620 to detect a current orientation parameter of the antenna; the transceiver 640 is configured to obtain remote electrical tilt data of multiple element arrays in the antenna that are corresponding to a target frequency band, where the remote electrical tilt data is determined according to a difference between a target orientation parameter of a beam of the multiple element arrays and the current orientation parameter; and the processor 610 is configured to adjust an orientation of the beam of the multiple element arrays according to the remote electrical tilt data.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and an orientation of the beam of the arrays is adjusted according to the remote electrical tilt data. Multiple element arrays in the antenna that are corresponding to each frequency band can be separately adjusted, and a beam of arrays corresponding to another frequency band is not affected, thereby improving antenna performance.

The methods disclosed in the foregoing embodiments of the present application may be applied to the processor 610, or implemented by the processor 610. The processor 610 may be an integrated circuit chip, and has a signal processing capability. In an implementation process, steps of the foregoing methods may be completed by means of an integrated logic circuit of hardware in the processor 610 or an instruction in a form of software. The foregoing processor 610 may be a general purpose processor, a digital signal processor DSP), an application-specific integrated circuit (ASIC), a field programmable gate array (FPGA) or another programmable logic device, a discrete gate or a transistor logic device, or a discrete hardware component. Various methods, steps, and logical block diagrams disclosed in the embodiments of the present application may be implemented or executed. The general purpose processor may be a microprocessor, or the processor may also be any conventional processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the field, such as a random access memory (RAM), a flash memory, a read-only memory (ROM), a programmable read-only memory, an electrically-erasable programmable memory, or a register. The storage medium is located in the memory 620, and the processor 610 reads information in the memory 620 and completes the steps in the foregoing methods in combination with the hardware of the processor 610. The bus system 630 may further include a power bus, a control bus, a status signal bus and the like, in addition to including a data bus. However, for clarity of description, various buses are marked as the bus system 630 in the figure.

The collaborative clustering device 600 can implement processes implemented by the antenna in the embodiment of FIG. 3. To avoid repetition, details are not described herein again.

Optionally, in another embodiment, the processor 610 is specifically configured to adjust an azimuth of the multiple element arrays according to the remote electrical tilt data when the current orientation parameter includes a current mechanical azimuth and the target orientation parameter includes a target azimuth.

Optionally, in another embodiment, the processor 610 is specifically configured to adjust a downtilt of the multiple element arrays according to the remote electrical tilt data when the current orientation parameter includes a current mechanical downtilt and the target orientation parameter includes a target downtilt.

Optionally, in another embodiment, the processor 610 is specifically configured to adjust an azimuth of the multiple element arrays according to the remote electrical tilt data and adjust a downtilt of the multiple element arrays according to the remote electrical tilt data when the current orientation parameter includes a current mechanical azimuth and a current mechanical downtilt and the target orientation parameter includes a target azimuth and a target downtilt.

Optionally, in another embodiment, the transceiver 640 is specifically configured to: send the current orientation parameter to a base station control center, so that the base station control center determines the remote electrical tilt data according to the difference between the target orientation parameter of the beam of the multiple element arrays and the current orientation parameter; and receive the remote electrical tilt data sent by the base station control center.

Optionally, in another embodiment, the transceiver 640 is specifically configured to receive the target orientation parameter of the multiple element arrays that is sent by a base station control center; and the processor 610 is specifically configured to calculate the difference between the target orientation parameter of the multiple element arrays and the current orientation parameter, and determine, according to the difference, the remote electrical tilt data corresponding to the difference.

Figure 7:
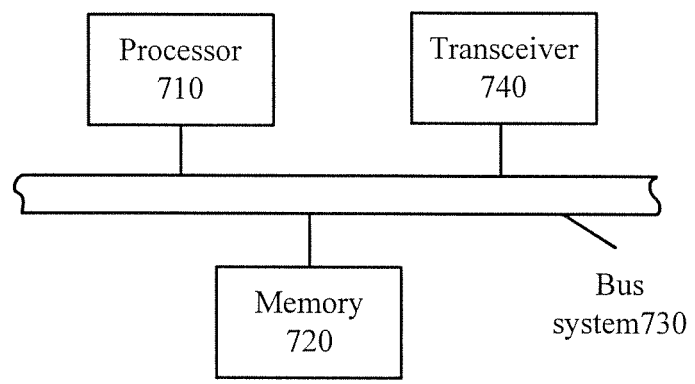
FIG. 7 is a schematic block diagram of a control center according to another embodiment of the present application.

FIG. 7 is a schematic block diagram of abase station control center according to another embodiment of the present application. Abase station control center 700 shown in FIG. 7 includes a processor 710, a memory 720, a bus system 730, and a transceiver 740. The processor 710, the memory 720, and the transceiver 740 are connected to each other by using the bus system 730.

Specifically, the processor 710 is configured to invoke, by using the bus 730, code stored in the memory 720 to obtain a current orientation parameter of an antenna, calculate a difference between the current orientation parameter and a target orientation parameter of multiple element arrays in the antenna that are corresponding to a target frequency band, and determine, according to the difference, remote electrical tilt data corresponding to the difference. The transceiver 740 is configured to send the remote electrical tilt data to the antenna, so that the antenna adjusts an orientation of a beam of the multiple element arrays according to the remote electrical tilt data.

Therefore, in this embodiment of the present application, a current orientation parameter of an antenna is detected; remote electrical tilt data of multiple element arrays in the antenna that are corresponding to a target frequency band is obtained, where the remote electrical tilt data is determined according to a difference between a target orientation parameter of a beam of the multiple element arrays and the current orientation parameter; and the remote electrical tilt data is sent to the antenna, so that the antenna adjusts an orientation of the beam of the multiple element arrays according to the remote electrical tilt data. Multiple element arrays in the antenna that are corresponding to each frequency band can be separately adjusted, and a beam of arrays corresponding to another frequency band is not affected, thereby improving antenna performance.

The methods disclosed in the foregoing embodiments of the present application may be applied to the processor 710, or implemented by the processor 710. The processor 710 may be an integrated circuit chip, and has a signal processing capability. In an implementation process, steps of the foregoing methods may be completed by means of an integrated logic circuit of hardware in the processor 710 or an instruction in a form of software. The foregoing processor 710 may be a general purpose processor, a digital signal processor (DSP), an application-specific integrated circuit (ASIC), a field programmable gate array (FPGA) or another programmable logic device, a discrete gate or a transistor logic device, or a discrete hardware component. Various methods, steps, and logical block diagrams disclosed in the embodiments of the present application may be implemented or executed. The general purpose processor may be a microprocessor, or the processor may also be any conventional processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the field, such as a random access memory (RAN), a flash memory, a read-only memory (ROM), a programmable read-only memory, an electrically-erasable programmable memory, or a register. The storage medium is located in the memory 720, and the processor 710 reads information in the memory 720 and completes the steps in the foregoing methods in combination with the hardware of the processor 710. The bus system 730 may further include a power bus, a control bus, a status signal bus and the like, in addition to including a data bus. However, for clarity of description, various buses are marked as the bus system 730 in the figure.

The collaborative clustering device 700 can implement processes implemented by the base station control center in the embodiment of FIG. 4. To avoid repetition, details are not described herein again.

Optionally, in another embodiment, the processor 710 is specifically configured to: when the current orientation parameter includes a current mechanical azimuth, the target orientation parameter includes a target azimuth, and the difference includes a difference between the target azimuth and the current mechanical azimuth, obtain, from a remote electrical tilt database according to the difference, remote electrical tilt data corresponding to the difference, where the remote electrical tilt data is used to adjust an azimuth of the multiple element arrays in the antenna that are corresponding to the target frequency band, and the remote electrical tilt database includes azimuth weight data corresponding to each frequency band of the antenna.

Optionally, in another embodiment, the processor 710 is specifically configured to: when the current orientation parameter includes a current mechanical downtilt, the target orientation parameter includes a target downtilt, and the difference includes a difference between the target downtilt and the current mechanical downtilt, generate downtilt remote electrical tilt data according to the difference, where the remote electrical tilt data is used to adjust a downtilt of the multiple element arrays in the antenna that are corresponding to the target frequency band.

Optionally, in another embodiment, the processor 710 is specifically configured to: when the current orientation parameter includes a current mechanical azimuth and a current mechanical downtilt, the target orientation parameter includes a target azimuth and a target downtilt, and the difference includes a difference between the target azimuth and the current mechanical azimuth and a difference between the target downtilt and the current mechanical downtilt, obtain, from a remote electrical tilt database according to the difference between the target azimuth and the current mechanical azimuth, first remote electrical tilt data corresponding to the difference between the target azimuth and the current mechanical azimuth, where the first remote electrical tilt data is used to adjust an azimuth of the multiple element arrays in the antenna that are corresponding to the target frequency band, and the remote electrical tilt database includes azimuth weight data corresponding to each frequency band of the antenna. The processor 710 is further specifically configured to generate second remote electrical tilt data according to the difference between the target downtilt and the current mechanical downtilt, where the second remote electrical tilt data is used to adjust a downtilt of the multiple element arrays in the antenna that are corresponding to the target frequency band.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present application. Execution sequences of the processes should be determined according to functions and internal logic of the processes, and shall not constitute any limitation on implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that may store program code, such as a USB flash drive, a removable hard disk, a read-only memory (ROM), a random access memory (RAN), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An antenna, comprising:
   a processor, configured to detect a current orientation parameter of the antenna;
   a transceiver, configured to obtain remote electrical tilt data of multiple element arrays in the antenna that are corresponding to a target frequency band, wherein the remote electrical tilt data is determined according to a difference between a target orientation parameter of a beam of the multiple element arrays and the current orientation parameter; and
   wherein:
   the processor is configured to adjust an orientation of the beam of the multiple element arrays according to the remote electrical tilt data; and
   the transceiver is configured to:
      send the current orientation parameter to a base station control center, and
      receive remote electrical tilt data, determined by the base station control center according to the difference between the target orientation parameter of the beam of the multiple element arrays and the current orientation parameter, sent by the base station control center.

2. The antenna according to claim 1, wherein:
   the current orientation parameter comprises a current mechanical azimuth;
   the target orientation parameter comprises a target azimuth; and
   the processor is configured to adjust an azimuth of the multiple element arrays according to the remote electrical tilt data.

3. The antenna according to claim 1, wherein:
   the current orientation parameter comprises a current mechanical downtilt;
   the target orientation parameter comprises a target downtilt; and
   the processor is configured to adjust a downtilt of the multiple element arrays according to the remote electrical tilt data.

4. The antenna according to claim 1, wherein:
   the current orientation parameter comprises a current mechanical azimuth and a current mechanical downtilt;
   the target orientation parameter comprises a target azimuth and a target downtilt; and
   the processor is configured to:
      adjust an azimuth of the multiple element arrays according to the remote electrical tilt data; and
      adjust a downtilt of the multiple element arrays according to the remote electrical tilt data.

5. The antenna according to claim 1, wherein:
   the target frequency band is one of the F band or the A band of Time Division-Synchronous Code Division Multiple Access TD-SCDMA, or the D band of Time Division Long Term Evolution TD-LTE.

6. An antenna, comprising:
   a processor, configured to detect a current orientation parameter of the antenna;
   a transceiver, configured to obtain remote electrical tilt data of multiple element arrays in the antenna that are corresponding to a target frequency band, wherein the remote electrical tilt data is determined according to a difference between a target orientation parameter of a beam of the multiple element arrays and the current orientation parameter; and
   wherein:
   the processor is configured to adjust an orientation of the beam of the multiple element arrays according to the remote electrical tilt data;
   the transceiver is configured to receive the target orientation parameter of the multiple element arrays that is sent by a base station control center; and
   the processor is configured to:
      calculate the difference between the target orientation parameter of the multiple element arrays and the current orientation parameter; and
      determine, according to the difference, the remote electrical tilt data corresponding to the difference.

7. The antenna according to claim 6, wherein:
   the current orientation parameter comprises a current mechanical azimuth;
   the target orientation parameter comprises a target azimuth; and
   the processor is configured to adjust an azimuth of the multiple element arrays according to the remote electrical tilt data.

8. The antenna according to claim 6, wherein:
   the current orientation parameter comprises a current mechanical downtilt;
   the target orientation parameter comprises a target downtilt; and
   the processor is configured to adjust a downtilt of the multiple element arrays according to the remote electrical tilt data.

9. The antenna according to claim 6, wherein:
the current orientation parameter comprises a current mechanical azimuth and a current mechanical downtilt;
the target orientation parameter comprises a target azimuth and a target downtilt; and
the processor is configured to:
   adjust an azimuth of the multiple element arrays according to the remote electrical tilt data, and
   adjust a downtilt of the multiple element arrays according to the remote electrical tilt data.

10. The antenna according to claim 6, wherein:
the target frequency band is one of the F band or the A band of Time Division-Synchronous Code Division Multiple Access TD-SCDMA, or the D band of Time Division Long Term Evolution TD-LTE.

* * * * *